United States Patent [19]

Savary

[11] Patent Number: 4,826,648
[45] Date of Patent: May 2, 1989

[54] NEUTRON ABSORBING BAR DAMPING DEVICE

[75] Inventor: Fernand Savary, Saint Leu La Foret, France

[73] Assignee: Framatome, Courbevoie, France

[21] Appl. No.: 84,348

[22] Filed: Aug. 12, 1987

[30] Foreign Application Priority Data

Aug. 13, 1986 [FR] France .................... 86 11697

[51] Int. Cl.$^4$ .............................................. G21C 7/20
[52] U.S. Cl. ................................................... 376/225
[58] Field of Search .............. 376/209, 225, 234, 285, 376/327

[56] References Cited

U.S. PATENT DOCUMENTS 3,321,372 5/1967 Challender .
3,762,994 10/1973 Kunzel .
4,073,684 2/1978 Cepkauskas .
4,711,756 12/1987 Nakazato .

FOREIGN PATENT DOCUMENTS 159509 10/1985 European Pat. Off. .
2406595 8/1974 Fed. Rep. of Germany .

Primary Examiner—Charles T. Jordan
Assistant Examiner—Richard Klein
Attorney, Agent, or Firm—Pollock, Vande Sande & Priddy

[57] ABSTRACT

A neutron absorbing bar for use in a PWR has an integrated damping device comprising a cluster of vertical absorbent rods fixed to the arms of a spider having a central pommel connectable to a drive mechanism. A damping device in the pommel includes a cylinder slidably receiving piston urged into a downward projecting position by springs contained in the cylinder. The cylinder and the piston are so formed that the leak flow at a cross-sectional area offered to the liquid driven out of the cylinder by the piston gradually decrease as the latter moves from an outermost position. The piston carries a hydromechanical damper damping the initial impact of the bar upon a scram.

7 Claims, 2 Drawing Sheets

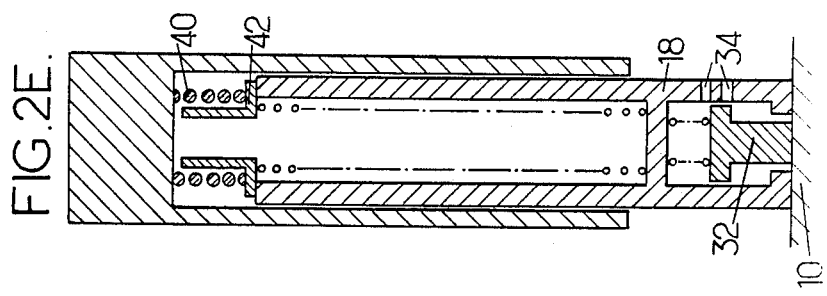
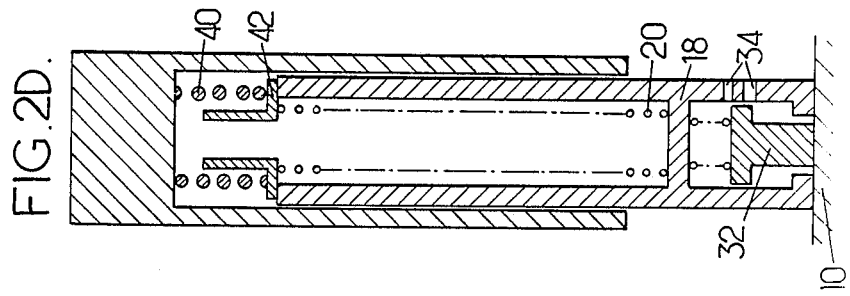
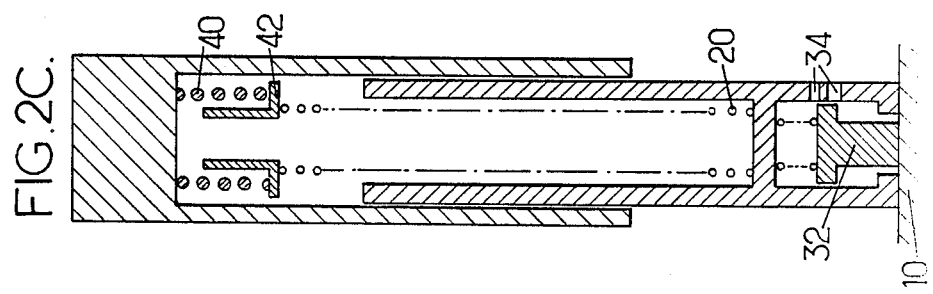
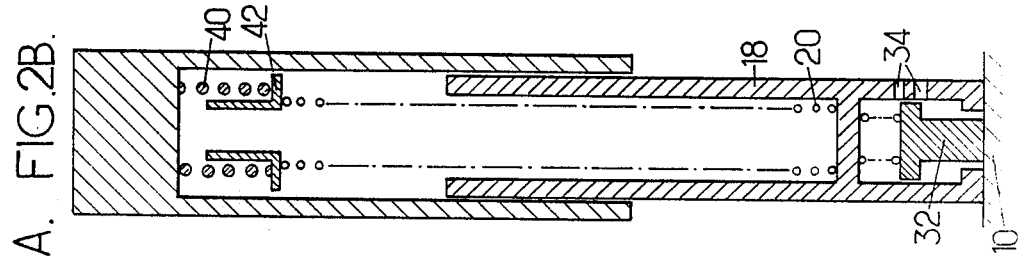
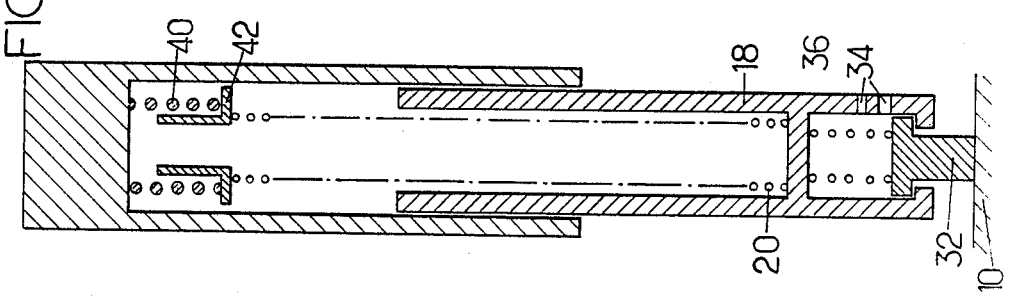

NEUTRON ABSORBING BAR DAMPING DEVICE

BACKGROUND OF THE INVENTION

1. Field of the Art

The invention relates to neutron absorbing bars for liquid cooled nuclear reactors of the type having a cluster of vertical parallel neutron absorbing rods fixed to arms of a spider having a central pommel connectable to a vertical moving mechanism and a damping device in the pommel. It is particularly suitable for use in pressurized water cooled and moderated reactors.

2. Prior Art

Neutron absorbing bars for nuclear reactors include rods which contain a neutron poison for controlling the reactivity in the core of the reactor. They are inserted into the core to a variable degree.

To cause an emergency shutdown of the reactor, all control bars are simultaneously lowered into the core by dropping them so that they enter the core under the action of their own weight.

To damp the shock when the pommel abuts against the upper core plate of the reactor or against the upper end piece of a respective fuel assembly, the provision of a shock damper has already been proposed. A control bar described in European Patent No. 159 509 has a damping device consisting of a cylinder formed in the pommel and slidably receiving a piston urged downwardly by resilient means contained in the cylinder. From the moment when the piston abuts the upper core plate, continued downward movement is opposed by the compression of the resilient means and by the pressure loss undergone by the liquid which flows out of the cylinder between the wall thereof and the piston. Such a damping device has, however, only a limited effect: the damping effect due to the pressure loss does not change substantially during movement of the piston and only the increasing stiffness of the spring provides progresivity. Furthermore, the device in the pommel interferes with the flow of cooling liquid.

Such shortcomings could be accepted for bars whose rods contain a neutron poison in coherent form and which do not require substantial cooling. It is no longer acceptable when the bars contain other compounds of limited resistance, and particularly when the rods of the bar contain a material used for varying the energy spectrum of the neutrons in the core. This material often consists of fertile material pellets (depleted uranium oxide, and/or thorium oxide for example) which do not withstand shocks.

SUMMARY OF THE INVENTION

It is an object of the invention to provide a neutron absorbing bar having a damping device reducing the shock impressed to the bar when it engages the core plate and allowing satisfactory cooling, particularly of the rods, under all operating conditions. It is to be kept in mind that, contrary to the rods containing a poison having parasitic absorption, the rods containing fertile material must be cooled by a flow of cooling liquid.

To this end, there is provided a bar of the above defined type wherein the cylinder and piston are formed so that the leak cross-sectional area offered to the liquid driven out of the cylinder by the piston decreases gradually during penetration of the latter from its position of maximum extension, and the piston has a hydromechanical damper for damping the impact when the bar initially contacts the upper core plate or fuel assembly for reducing the speed of the piston.

BRIEF DESCRIPTION OF THE DRAWINGS

The invention will be better understood from the following description of a particular embodiment, given by way of example. The description refers to the accompanying drawings, in which FIGS. 2A to 2E are diagrams showing successive operating phases of the damper received in the pommel shown in FIG. 1.

DESCRIPTION OF PREFERRED EMBODIMENT

Figure 1:
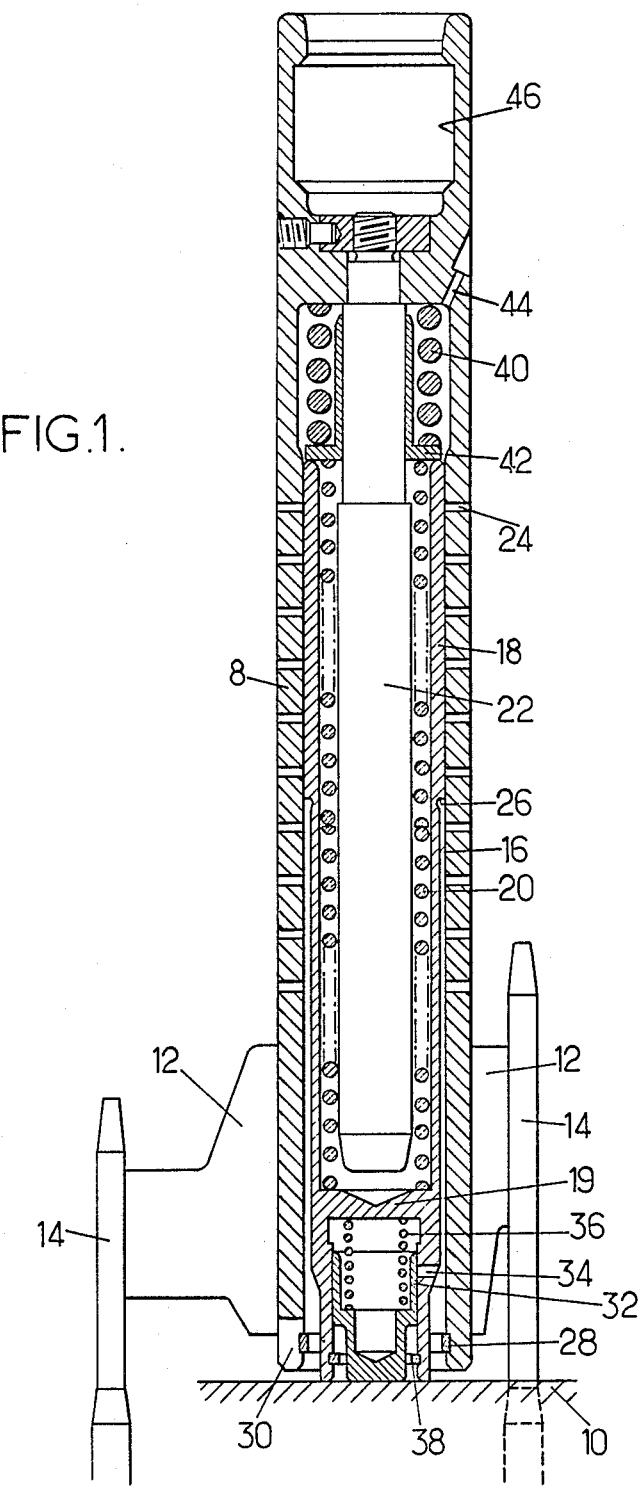
FIG. 1 shows the pommel of a bar of the invention, in section through a vertical plane passing through its axis.

A neutron absorbing bar as described may be used in present day reactors as well as in spectrum shift reactors still in the design stage. It may, for example, be used in combination with a fuel assembly as disclosed in European Patent No. 159 509 already mentioned or with a fuel assembly as described in French Patent No. 84 19917.

Referring to FIG. 1, the relative position of the pommel or hub 8 of an absorbant bar and of the elements which it contains is shown when the bar is separated from its drive shaft and rests on a bearing surface 10 which will be assumed to be the upper core plate of a reactor (but which could be the upper end nozzle of a fuel assembly). Pommel 8 and radial fins 12 connected thereto constitute a unit generally called "spider". The arms 12, formed as thin vertical vanes, carry vertical rods 14 which, in the position in which the pommel is shown, are completely engaged in guide tubes of one or more fuel assemblies. The drive shaft (not shown) has a conventional gripper whose fingers may be spread out for engagement into an upper internal recess 46 of the pommel.

The damping device incorporated in pommel 8 may be considered as including three parts, namely a hydraulic brake, a damper or "dashpot" for attenuating the initial shock and an end-of-travel load absorbing coil spring.

The hydraulic brake comprises a cylinder formed in the sleeve and closed at its upper end. A hollow piston 18 is slidably sealingly received in the bore 16 of the cylinder.

The piston 18 has a transverse wall 19 supporting resilient return and damping means 20. As shown, the resilient means consist of two helical springs in series relation, having opposite winding directions to avoid rotational effects. The two springs 20 are guided by a central rod 22 fixed to the bottom wall of the cylinder.

The cylindrical wall of the cylinder is formed with openings 24 for throttling the water flow forced out of the cylinder by piston 18. The openings are spaced apart along the cylinder. They are distributed in a longitudinal plurality of sets (for example each of two holes) to balance the hydrodynamic transverse thrusts due to the water jets which during movement of the piston are forced out of the cylinder. The number of sets will depend on the desired progressivity, taking into account the difference in conditions when the coolant is cold and when hot. In practice, sixteen sets will generally be sufficient.

Piston 18 advantageously has a downwardly directed radial shoulder 26 between a portion which has a sliding fit in the cylinder and a portion which has an annular clearance. The shoulder 26 is at such a distance from the lower end of the piston that the clearance communicates with the lower sets of openings 24 even when the bar is completely inserted in the core (FIG. 1), for providing a cooling water flow.

The extent of downward travel of piston 18 is limited by a stop ring 28 housed in an internal groove of the cylinder. As shown in FIG. 1, the pommel has at its lower part a slot 30 for easier access to the stop ring 28. The ring may be welded in position.

The purpose of the shock damper is to attenuate the shock of piston 18 upon bar fall. The damper has a plunger 32 slidable in a blind bore formed in the piston below the dividing wall 19. A reset spring 36, of low stiffness as compared with spring 20, biases the plunger 32 downwardly against a stop ring 38. A restricted hole (or holes) 34 formed in the wall of the piston opposes a calibrated head loss to flow of liquid driven out by plunger 32 upon impact. A single hole has been shown in FIG. 1, but in general several holes will be provided with such a spacing that the impact speed of piston 18, when the plunger 32 is completely retracted, is reduced to as low a value as possible.

Finally, an end-of-travel spring 40 is retained between the bottom of the cylinder and a flanged thimble 42 on which the resilient means 20 also rest. The flanged thimble 42 has a longitudinal size such that the piston 18 comes in abutment thereagainst at the end of travel of the hydraulic brake. The compression of spring 20 absorbs the residual momentum of the bar after hydraulic braking. One or more openings 44 may be provided in the cylinder for allowing the liquid to flow out of the cylinder during the upward movement of flanged thimble 42.

When the pommel bears on the core-plate, as shown in FIG. 1, the plunger 32 is completely retracted in the piston. The latter projects by a slight amount, retained by the compression force exerted by the end-of-travel spring 40.

The device operates as follows:

As long as the bar is connected to its drive shaft, plunger 32 is held down in abutment against ring 38 by spring 36. The shoulder 26 of piston 18 is held in abutment against the stop ring 28 by springs 20. The springs 20 are prestressed such that the piston 18 remains in abutment against ring 28 despite inertial forces generated by the step-by-step control of the bar drive mechanism, which frequently causes accelerations reaching 15 g. It will generally be sufficient for the spring 20 to have a prestressing at rest of about 20 daN, if the weight of piston 18 is low enough. Finally, the end-of-travel spring 40 is completely relaxed.

During a first phase of operation, only the shock damper of the dashpot acts: from the time that plunger 32 comes into contact with core plate 10 (FIG. 2A), the plunger is moved into the piston 18 and drives liquid through the openings 34. At the end of the first phase (FIG. 2B) the piston 18 comes into contact with plate 10.

During the second phase, piston 18 moves along the cylinder, compresses springs 20 and drives out water from the cylinder through the openings 24 (not shown in FIGS. 2A-2E) which oppose a pressure drop which increases as the piston moves (FIG. 2C).

The second operating phase ends when piston 18 comes into abutment against flange 42 (FIG. 2D) and begins to compress the end-of-travel spring 40. Continued penetration of piston 18 causes spring 40 to compress until complete damping is obtained (FIG. 2E).

The openings 24 may all be located above the arms in which case they may be drilled after the arms have been screwed to the cylinder.

I claim:

1. A neutron absorbing bar for a liquid cooled nuclear reactor, including a cluster of vertical neutron absorbing rods fixed to arms of a spider having a central pommel connectable to a drive mechanism and a damping device in the pommel, said damping device including: a cylinder formed in said pommel and opening downwardly; a piston slidably received in said cylinder and urged downwardly toward a predetermined outermost position by resilient means contained in said cylinder; and a hydromechanical damper carried by said piston and arranged for abutting a stationary part upon release and fall of the bar for exerting a shock damping action; wherein a plurality of sets of calibrated openings are formed in a lateral wall of the cylinder are distributed along the length thereof so as to be covered successively by the piston during upward movement thereof into the cylinder and to provide a leak cross-sectional flow area to liquid forced out of the cylinder upon movement of the piston into the cylinder which decreases gradually as the amount of movement of said piston into said cylinder increases.

2. Bar according to claim 1, wherein the piston has a downwardly directed radial shoulder whereby the wall of said piston under said shoulder define with the cylinder an annular clearance into which said sets of openings open when uncovered.

3. Bar according to claim 1, wherein a spring of low stiffness as compared with that of the resilient means is compressed between said piston and a bottom wall of said cylinder.

4. Bar according to claim 1, wherein the resilient means comprise two helical springs placed in mutually abutting series relation and having opposite winding directions.

5. Bar according to claim 1, further comprising an end of travel spring interposed between a bottom wall of the cylinder and a vertically slidable abutment thimble arranged for receiving the piston when the latter has travelled over a predetermined length from said predetermined position.

6. Bar according to claim 5, wherein abutment of the piston on the thimble takes place after the piston has moved upwardly beyond all the holes providing the leak for cross-sectional area.

7. A neutron absorbing bar for a liquid cooled nuclear reactor, including a cluster of vertical neutron absorbing rods fixed to arms of a spider having a central pommel connectable to a drive mechanism and a damping device in the pommel, said damping device including: a cylinder formed in said pommel and opening downwardly; a piston slidably received in said cylinder and urged downwardly toward a predetermined outermost position by resilient means contained in said cylinder; an end of travel spring interposed between a bottom wall of the cylinder and a vertically slidably abutment thimble arranged for receiving the piston when the latter has travelled over a predetermined length from said predetermined position; and a hydromechanical damper carried by said piston and arranged for abutting a stationary part upon release and fall of the bar for exerting a shock damping action; wherein a plurality of sets of calibrated openings are formed in a lateral wall of the cylinder and distributed along the length thereof so as to be covered successively by the piston during upward movement thereof into the cylinder and to provide a leak cross-sectional flow area to liquid forced out of the cylinder upon engagement of the piston into the cylinder which decreases gradually as the amount of movement of said piston into said cylinder increases.

* * * * *